Figure 1:
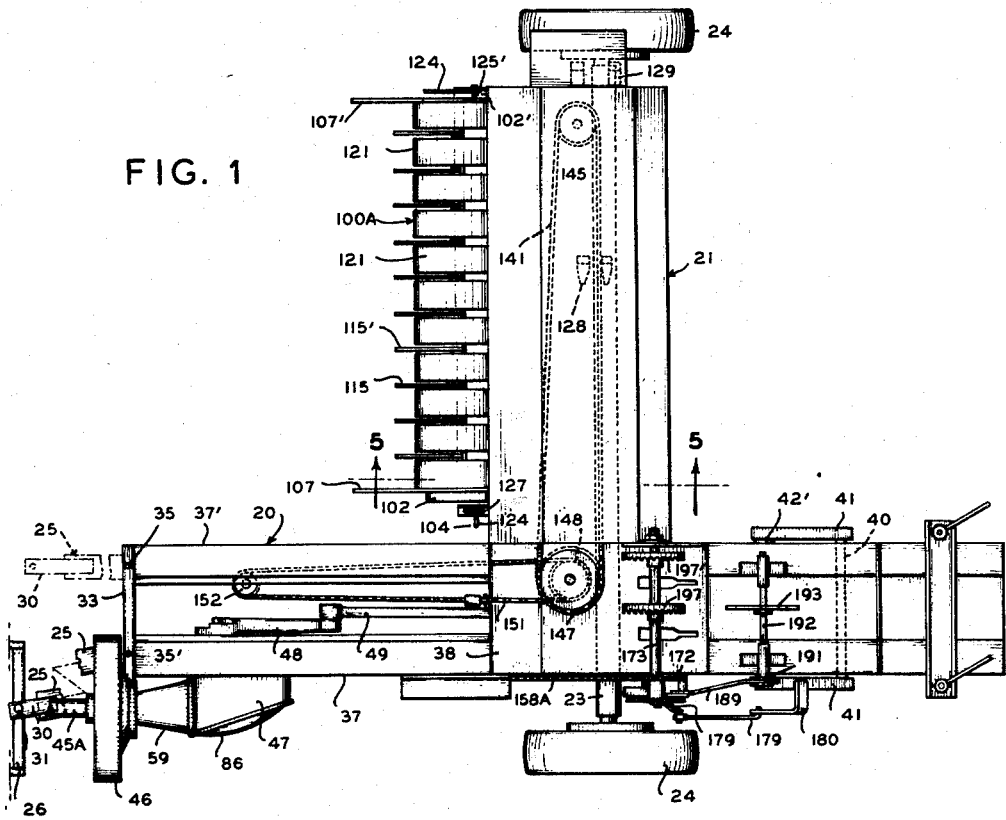

Aug. 9, 1960 W. R. LONG 2,948,101
HAY BALER
Filed April 22, 1957 4 Sheets-Sheet 1

INVENTOR
W. R. LONG
BY A. Yates Dowell
ATTORNEY

Aug. 9, 1960 W. R. LONG 2,948,101
HAY BALER
Filed April 22, 1957 4 Sheets-Sheet 2
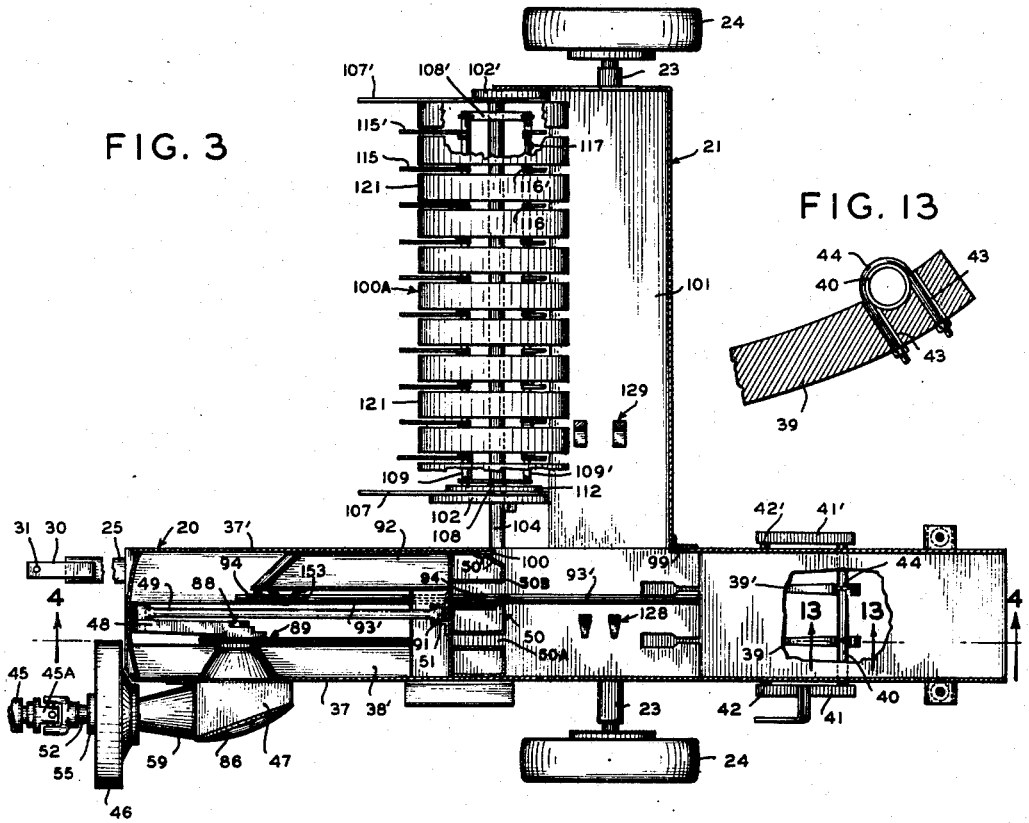
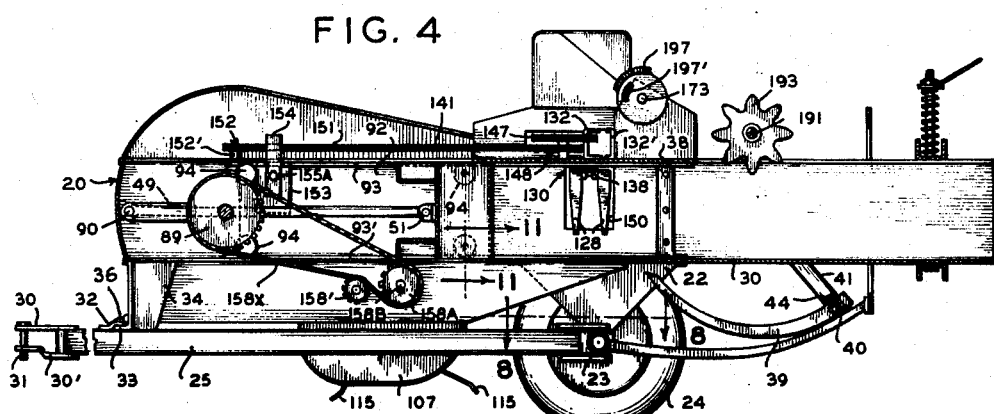
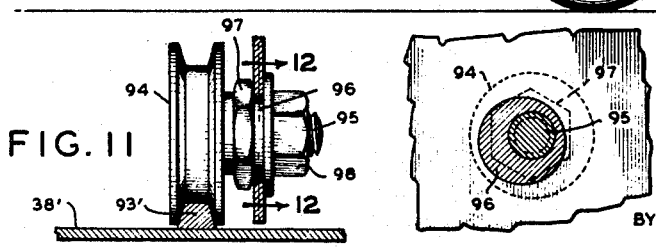
INVENTOR
W. R. LONG
BY A. Yates Dowell
ATTORNEYS Aug. 9, 1960

W. R. LONG 2,948,101

HAY BALER

Filed April 22, 1957

4 Sheets-Sheet 3

INVENTOR
W. R. LONG

BY A. Yates Dowell
ATTORNEY

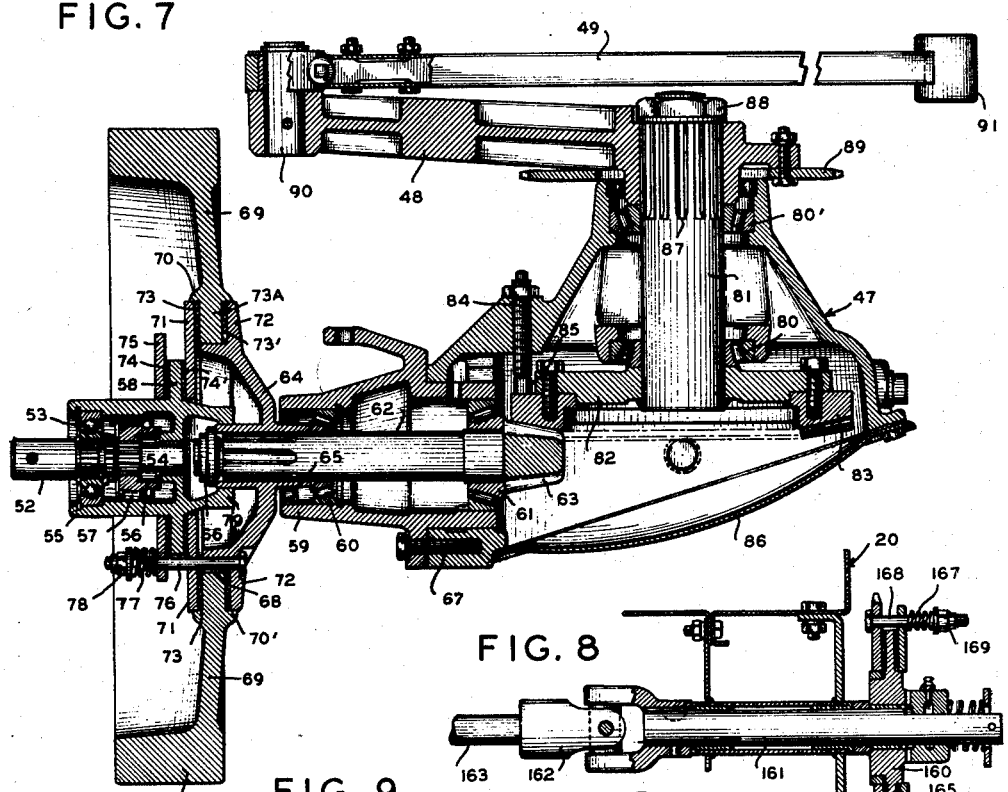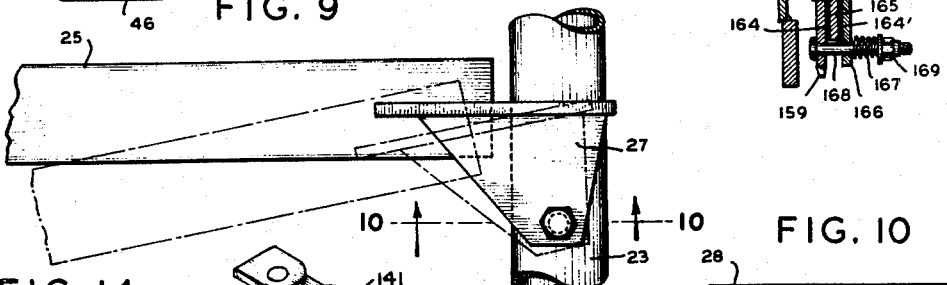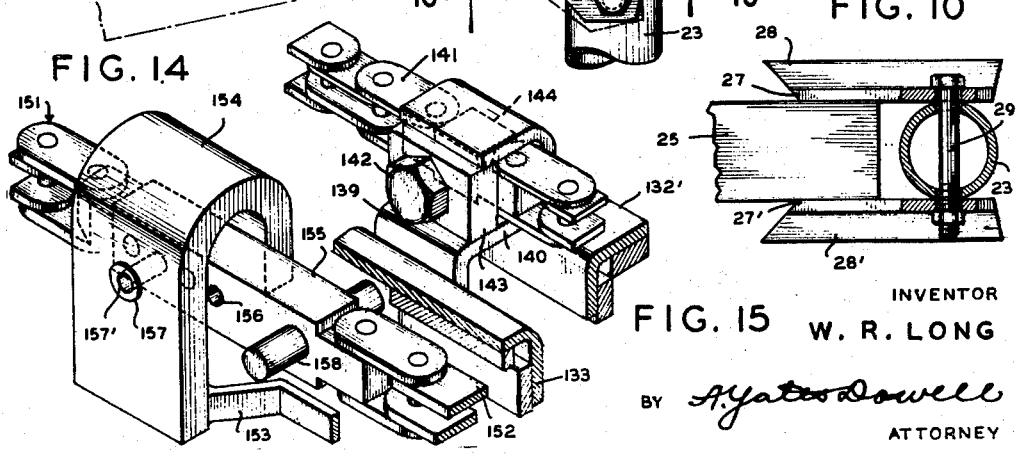

United States Patent Office 2,948,101
Patented Aug. 9, 1960

2,948,101

HAY BALER

William R. Long, Tarboro, N.C., assignor to Long Manufacturing Co., Inc., Tarboro, N.C.

Filed Apr. 22, 1957, Ser. No. 654,320

16 Claims. (Cl. 56—341)

The present invention relates to a hay baler and more particularly to the type of hay baler drawn behind a tractor and operated by the power take off of the tractor for picking up hay from windrows and automatically forming bales.

Heretofore hay balers have been made of relatively large size requiring excessive power to form the bale and particularly to operate the plunger because of the relatively long plunger stroke which required relatively high power. Further, the hay fed to the bale-forming chamber would frequently be jammed before being cut, resulting in increased friction which required additional power without producing useful work.

An object of the present invention is to provide a small size hay baler which can be produced at low cost and operated with low power requirements.

Another object of the invention is to provide a cutter arrangement for hay fed into the bale-forming chamber designed to maintain a sharp edge under extended use.

A further object is to provide an effective means with a minimum of parts for feeding hay to the bale-forming chamber.

A further object is to provide effective guide means for the plunger of a baling device providing for accurate guidance, adjustment for wear, and operable without danger of clogging or jamming.

Another object is the provision of a towing tongue structure adjustable to draw the baler in its operative position to one side of and behind the tractor or to a position directly behind the tractor for reducing the overall width of the tractor and baler when the tractor and baler are moved between fields or along a highway.

A further object is to provide means to effectively feed loose hay into the bale-forming chamber for obtaining uniform distribution therein for compression by the plunger.

Another object is to provide a plunger with guide means and a cutter which can operate through a shorter stroke while having satisfactory capacity.

Another object is to provide driving means for the bale-forming and pick-up structure directly from a power take-off of a towing tractor with a minimum change in angular velocity due to universal joint, or the like in the driving, and also to provide compensating clutch and driving mechanism for avoiding strains in the drive, thereby providing a structure for a long useful life at maximum efficiency.

A further object is to provide a one revolution clutch on the knotter-shaft for operating the needles at a definite pre-determined time.

Another object is to provide an accurate means for measuring the length of the bales of hay and to obtain uniform size of completed bales.

A further object is to provide mountings for the needles to permit accurate adjustment and spacing.

A still further object is to provide a control means and operating means for needles and means to accurately control the length of a bale.

Another object is to provide a drive for the baler which avoids unnecessary strains due to irregularity in the speed of rotation or due to angular displacement of the parts.

A further object is to provide a baler of small size which can operate at relatively high speeds.

Another object is to provide a friction drive for a machine and friction connection to a flywheel for preventing stresses and strains due to changes in velocity or due to sudden stoppage.

Figure 2:
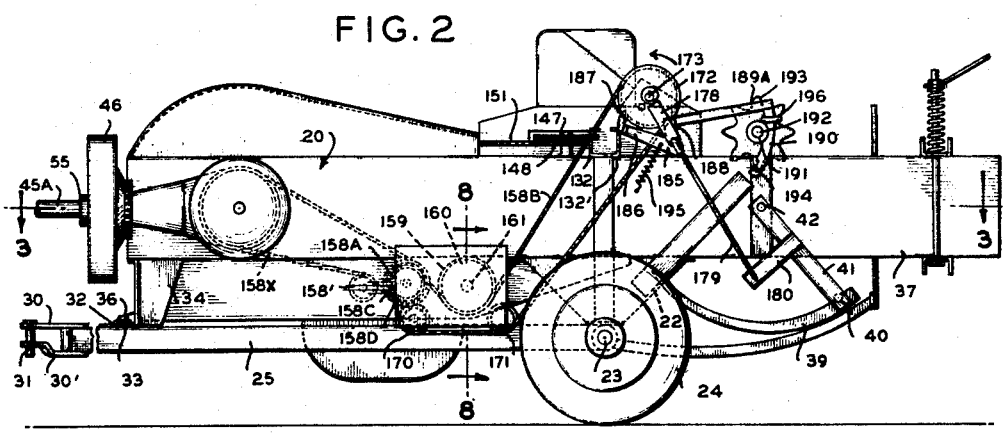
Figure 16:
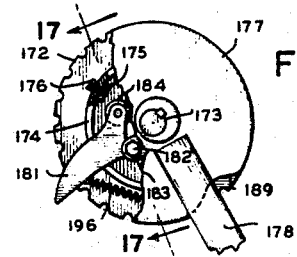
Figure 17:
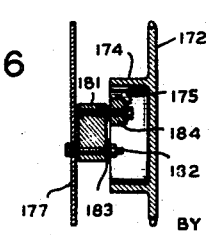
Figure 5:
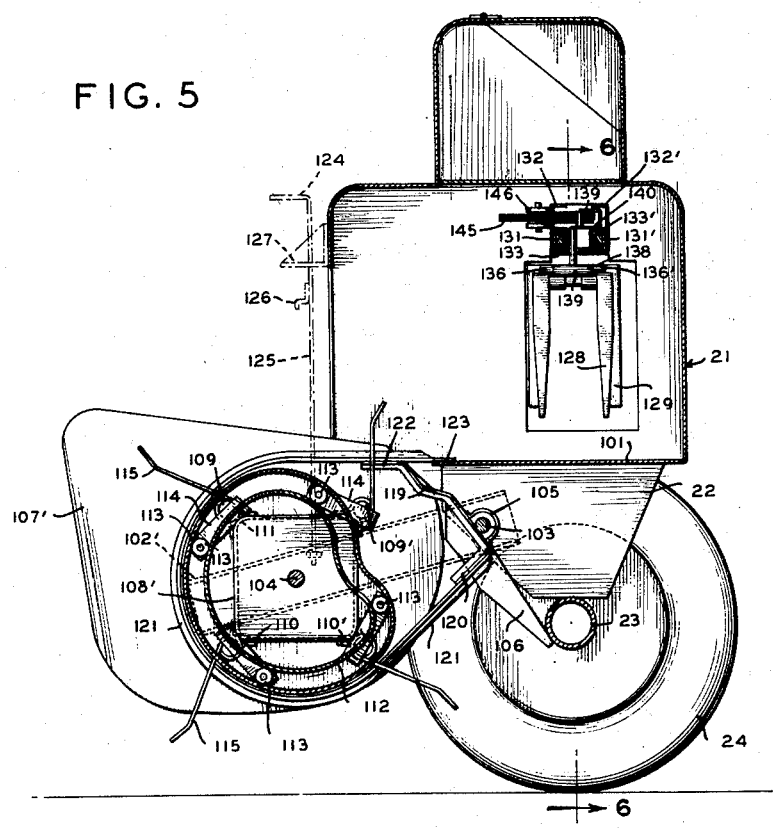
Figure 6:
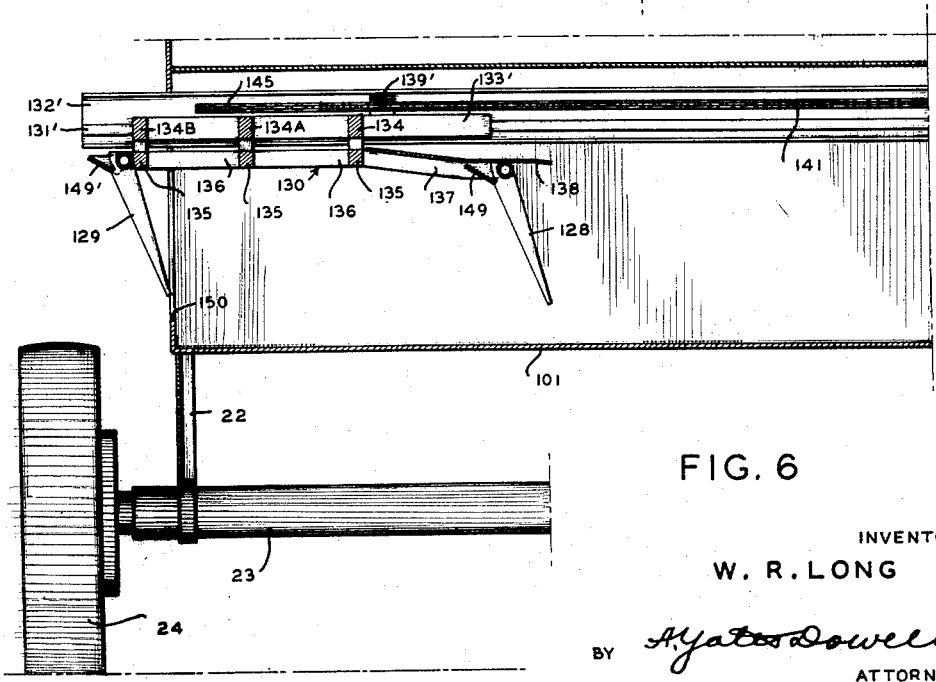

Other and further objects will be apparent as the description proceeds and upon reference to the accompanying drawings, wherein:

Fig. 1 is a plan view of the baler according to the present invention attached to a transverse tow-bar of a tractor;

Fig. 2, a side elevation of the same with the transverse tractor tow bar omitted;

Fig. 3, a horizontal section taken substantially on line 3—3 of Fig. 2, showing the plunger and its operating mechanism;

Fig. 4, a vertical section taken substantially on line 4—4 of Fig. 3, and showing the operating mechanism for driving the fork-feed which supplies loose hay to the bale-forming chamber;

Fig. 5, an enlarged vertical section taken substantially on line 5—5 of Fig. 1 and showing the two forks of the fork feed in their retracted position;

Fig. 6, a fragmentary vertical section of the right-hand portion of the fork-feed of the baler in retracted position and taken substantially on line 6—6 of Fig. 5;

Fig. 7, a horizontal sectional view taken through the driving mechanism and through the gear housing showing the pinion and ring gear shafts with the free wheeling device, and the friction clutch drive for the baler and fly wheel;

Fig. 8, an enlarged vertical section of the drum pick up drive taken substantially on line 8—8 of Fig. 2;

Fig. 9, a plan view on an enlarged scale of the pivotal connection of the towing tongue to the axle;

Fig. 10, a vertical section taken on line 10—10 of Fig. 9;

Fig. 11, an enlarged detail of a lower roller on its cooperating rail for guiding the plunger, taken substantially on line 11—11 of Fig. 4;

Fig. 12, a section taken on line 12—12 of Fig. 11 showing the adjustment of the roller guide;

Fig. 13, a detail sectional view of the needle mounting taken on line 13—13 of Fig. 3;

Fig. 14, a perspective of the connection of the fork feed driving chain to the plunger;

Fig. 15, a perspective of the connection of the fork feed driven chain to the fork feed carriage;

Fig. 16, a fragmentary section of the cam, and one revolution clutch drive for the needles and the knotter shaft; and Fig. 17, a fragmentary section taken on line 17—17 of Fig. 16.

Briefly, the present invention comprises a hay baler having an elongated bale-forming chamber with a pick-up apron extending to the right side thereof and a rotatable pick-up drum with outwardly projecting tines for picking up hay from a windrow and depositing such hay on the horizontal portion of the apron. Guides are provided rearwardly of the pick-up drum above the horizontal apron in which a slide carriage is mounted for reciprocating movement, said slide carrying a pair of forks for pushing hay into the bale-forming chamber.

A plunger positioned in the chamber is mounted by means of adjustable grooved rollers on a single upper guide and a single lower guide rail, each rail being of trapezoidal configuration and fixed to the top and bottom of the bale forming chamber. The guide rollers cooperate with the guide rails and are in offset relation to the axis of the plunger. A gearbox and crank are mounted on the left side of the baler and are driven by a telescoping shaft and universal joint from the power take off of a tractor through an overload friction clutch and a one-way free wheeling roller clutch. A flywheel is frictionally connected to the drive so as to avoid impact forces. The crank is connected by a pitman to the plunger closely adjacent the rearward or hay engaging end of the plunger.

The reciprocating fork feed is operated by a chain drive, including a driving chain passing over an idler front sprocket and a double rear sprocket and located above the bale-forming chamber, with the driving chain positively connected to a forwardly extending portion of the reciprocating plunger to produce reciprocating motion of the driving chain. A driven chain passes over the second sprocket of said double sprocket and over an idler sprocket on the extreme right of the pick-up apron. The fork-feed carriage is slidably mounted in guides for parallel movement with one run of said driven chain. An upward extension from the carriage of the fork-feed frame is secured to the said one run of the driven chain to provide for simultaneous driving of the fork-feed by the reciprocating motion of the plunger. The hay is intermittently fed by the fork feed through an opening in the right side of the bale chamber and fibers of hay must be cut and for this purpose a cutter blade is mounted on the plunger with its cutting edge in forwardly offset relation to the hay engaging face of the plunger, while the stationary cutter blade is fixedly mounted on the rear edge of the hay receiving opening of the bale-forming chamber, whereby compression of the hay occurs before the blades contact the hay thereby improving the cutting action and avoiding tearing of the hay and abrasion of the sharp edges of the cutter blades which results in reduced friction losses.

The needles are mounted on the usual bar and arranged for adjustment and for cooperation with suitable conventional type knotters mounted above the bale-forming chamber. The length of the bale is accurately measured with a toothed wheel engaging the bale and such toothed wheel operates an arcuately shaped length measuring member which controls an improved single revolution clutch for the shaft which operates the needles and the knotter.

From the above it should be apparent that the baler of the present invention is moved along the field by a tractor which also furnishes power through its power take off to the baler which has mechanism to continuously pick up the hay forming bales of definite length. The baler may be operated at relatively high speeds with greater efficiency than that previously known and with a minimum of vibration because of the light weight of the relatively small parts.

Referring more particularly to the drawing, an elongated bale forming housing 20 has a laterally extending pick up apron 21 projecting from the right side thereof and such housing and pick up apron are provided with downwardly extending brackets 22, 22 which are supported on a laterally extending axle 23 having ground engaging wheels 24, 24 for supporting the baler for movement over the ground. The towing tongue 25 extends from the axle 23 to a transverse horizontal tow bar 26 on a towing tractor and is provided at its rear end with an upper plate 27 (Figs. 9 and 10) and a lower plate 27' welded to the towing tongue 25, such plates 27 and 27' having upwardly extending reinforcing flanges 28 and 28' respectively, the plates 27 and 27' embracing the axle 23 and being pivotally secured thereto by a bolt 29 passing through aligned apertures in the plates 27, 27' and through registering aligned apertures in the axle 23.

The towing tongue 25 is shown in full line position in Figs. 1 and 2 for operation in a field so that the pick up apron 21 will pick up hay from the windrows. The full line position of the tongue shown in Figs. 3 and 4 and the dotted line position of Fig. 1 represent the position for movement of the baler between fields or over the highway so that the baler will trail directly behind the tractor thereby reducing the total width of the tractor and baler for passage on highways. Secured to and projecting forwardly of the front end of the tongue 25 is an upper strap 30 and a lower strap 30' provided with aligned apertures for receiving a pin 31 for pivotal attachment to the tow bar 26 of the tractor, the upper strap 30 projecting rearwardly. An offset strap section 32 is fixed to the tongue 25 and lies above a laterally extending flange 33 fixed to the lower edge of a bracket 34, depending from the housing 20. The bracket 34 has a plurality of apertures 35, 35' and strap section 32 has a registering aperture for receiving a pin 36 for securing the tongue 25 in either position, it being apparent that the tongue may pivot about bolt 29 between the two limiting positions.

The bale forming housing 20 is provided with left and right side walls 37, 37', a top wall 38, and a bottom wall 38' the top and bottom walls having suitable apertures for the accommodation of the needles 39, 39' which are secured to needle support bar 40 extending between arms 41, 41' which are pivotally mounted on stub shafts 42, 42' in a well known manner. The needles 39 and 39' are provided with transversely elongated slots 43, 43 which receive the legs of U-bolts 44 welded by their bight portions to the bar 40 and provide for lateral adjustment of the needles, suitable nuts being provided on the ends of the threaded legs of the U-bolt 44 to provide for angular adjustment of the needles on the needle bar 40 by tightening one nut and loosening the other whereby the needles can be accurately aligned with needle receiving openings in the bottom and top walls 38' and 38 respectively and with the knotters for operation with the conventional knotters or wire tiers (not shown).

The baler receives power from the conventional power take off of a tractor through a telescoping shaft 45 having universal joints 45A at each end, the power being transferred by a one way clutch 55 and a yieldable friction clutch 73, 73A, 74, 74' to the pinion shaft 62 of a gear housing 47, the mechanism providing suitable drive structure which operates a crank 48 driving a pitman 49 connected to a plunger 50 by means of a pivotal connection including lugs 51. A frictionally driven flywheel 46 is mounted for rotation and connected to the drive by a yieldable friction clutch 73.

Referring more particularly to the drive structure and particularly Fig. 7 of the drawing, the universal joint 45A at the rear of telescoping shaft 45 is connected to a stub shaft 52 which is rotatably mounted by means of anti-friction bearings 53 and a bushing 54 in a hub 55 of a free wheeling unit of the type currently used in Ford automobiles. A splined portion of the shaft 52 carries a cam 56 which reacts by means of rollers 57 against the inner periphery of the hub 55 to provide for positive driving relation in one direction, the hub 55 having an outwardly extending clutch flange 58.

Mounted in a recess in the gear housing 47 is a pinion carrying case 59 supporting anti-friction bearings 60, 61 in which a pinion shaft 62, is rotatably mounted, such pinion shaft carrying a pinion gear 63, the shaft 62 being splined at its forward end and supporting a flywheel mounting disc 64, the hub 65 of mounting disc 64 having cooperating teeth for cooperation with the splines of the pinion shaft 62. The flywheel mounting disc 64 is secured in position on pinion shaft 62 by a nut 66 which is locked in position by suitable means. The pinion case 59 is fixed to the ring gear housing 47 by means of bolts 67, the adjustment between the gears being accomplished by means of shims in a well known manner.

The periphery of the flywheel supporting disc 64 is rabbeted to provide a cylindrical surface 68 which cooperates with a circular surface on the inner periphery of a disc flange 69 of the flywheel 46, a circumferential shoulder 70' at the rear surface of the disc be ing provided for cooperation with an intermediate clutch plate 71 and the radiating flange 72 of the flywheel supporting disc 64. An inwardly extending portion 73 of the flywheel disc provides surfaces which engage with cooperating annular friction elements 73, 73' and other friction elements 74, 74' cooperate with the clutch flange 58 of the free wheeling hub 55 and also with the forward surface of the clutch plate 71 and the rearward surface of another clutch plate 75 to provide for yieldable frictional driving from the free wheeling hub 55 to the pinion shaft 62. The clutch plates 71, and 75 are maintained in operative position with respect to the flywheel mounting disc 64 by means of a plurality of bolts 76 which pass through the clutch plates 75 and 71 as well as the flywheel mounting disc 64 such bolts 76 having pressure producing springs 77 which are adjustable by means of the self-locking nuts 78. The design of the clutches and the adjustment of the tension on the springs 77 is arranged so that a maximum torque of approximately 250 pound feet is obtained between the free wheeling hub 55 and the clutch plate 71 while the friction between the flywheel 46 and plate 71 and the mounting disc 64 is designed to slip when the torque exceeds 400 pound feet.

It will be noted that the rearward extension of the free wheeling hub 55 has an inwardly extending guiding portion 79 surrounding the hub portion 65 of the flywheel supporting disc 64 whereby proper relation for assembly and guiding action for operation is obtained.

The ring gear housing 47 is provided with antifriction bearings 80, 80' which support the ring gear shaft 81 to which a flange 82 is securely fixed such as by welding or the like and on which flange 82 a ring gear 83 is securely mounted by means of bolts or the like. Extending through the housing 47 is a threaded stud 84 which is threadedly adjustable therethrough carrying a bearing plug 85 of suitable material at its inner end which is maintained in adjusted relation to support the ring gear 83 in proper operative position with respect to pinion gear 63 in the event that an excessive load is placed on the gears, the bearing plug 85 serving to take the lateral thrust on the ring gear. A cover plate 86 is mounted on the gear case and sealing rings provided for retaining lubricant in the case and preventing the ingress of foreign matter.

The ring gear shaft 81 projecting outwardly through housing 47 has its spline 87 fixed to the crank 48 by means of a nut 88 and a driving sprocket 89 is secured to the hub portion of the crank 48 by bolts. The outer end of the crank 48 is provided with pivot pin 90 on which one end of the pitman 49 is rotatably mounted, the other end of the pitman being provided with a bearing boss 91 received between lugs 51 on the plunger 50, a pin passing through the lugs 51 and boss 91 to provide for pivotal movement.

The plunger 50 is fabricated of sheet metal and has needle receiving slots 50A, 50A in its rear or operative face 50B and a forwardly extending box shaped portion 92 providing for accurately guiding the plunger, reinforcing plates and the like being provided to obtain the desired rigidity thereof. For accurately guiding the plunger, a top guide rail 93 and a bottom guide rail 93' are mounted on the inner surfaces of the top 38 and the bottom 38' respectively of the bale forming housing 20 and suitable rollers 94, 94 having grooves of trapezoidal shape are adjustably mounted on the plunger and the forward extension of the box shaped portion of the plunger to accurately guide the plunger. The rollers 94 include a threaded stud 95, concentric with the roller and having an eccentric mounting portion 96 whereby the axis of each roller which may be adjusted by rotating the eccentric 96 by means of the polygonal flange 97, the parts being held in adjusted position by a nut 98 which presses against a washer which contacts the adjacent portion of th plunger, the eccentric 96 being sufficiently thin so that the washer securely engages the wall portion of the plunger.

It will be observed that the side wall 37' of the bale forming housing is provided with a hay receiving opening for the passage of hay from the apron 101. The plunger 50 reciprocates past such opening compressing each increment of hay and at the rear edge of such opening, a ledger cutting blade 99 is secured to the housing and such ledger cutting blade cooperates with a movable cutting blade 100 which is secured to the plunger at an offset portion 50' said cutter trailing the operative face of the plunger 50 during compaction. The cutting blade 100 is spaced forwardly of the operative surface of the plunger 50 so that hay is contacted by the surface of the plunger before contacting cutting blade 100 and the hay is not dragged past the cutting edge of the blade 100 thereby lengthening the life of the blade and also assisting in the cutting operation since the hay is substantially compressed between the rear or operative surface 50B of the plunger 50 and the previously formed portion of the bale before the movable cutter blade 100 contacts the hay to cut such hay in cooperation with the fixed cutter blade 99.

*Pick-up device*

The hay is picked up from the ground by means of a spring tooth cam controlled drum type pick-up which deposits hay on the horizontal floor 101 of the pick-up apron 21. The pick-up drum 100A is rotatably mounted on arms 102, 102' which are pivotally connected to brackets 22 by pivot pins 103, 103' respectively while a shaft 104 is rotatably mounted in suitable bearings on the arms 102, 102' and spaced from the pivot 103. The arms 102 and 102' are connected together by an arcuate channel member 105 fixed in position to both arms so that the arms 102 and 102' remain in relatively fixed relation for pivotal movement about the pivots 103 and 103' thereby keeping shaft 104 substantially parallel to pivots 103, 103'. A downwardly extending member 106, fixed substantially centrally to channel 105 abuts the axle 23 when the pick-up is in its operative full line position thereby maintaining the drum pick-up in correct position with respect to the ground. Fixed to arms 102 and 102' are guiding baffle plates 107, 107' which extend parallel to the direction of movement of the baler. Fixedly mounted on the rotating shaft 104 are square pan-shaped elements 108, 108' and at each corner of the pans stub shafts 109 and 109' are mounted for pivotal movement by means of bearing cap elements 110, 110' suitably fixed to the associated pan 108 or 108' by bolts or the like. Elongated angle members 111 extend between and are fixed to associated stub shafts 109, 109'.

Fixed to the left arm 102 is a general heart shaped cam 112 of channel cross section and cooperating with such cam are cam follower rollers 113 mounted on arms 114 which are fixed to the stub shafts 109 whereby the shafts 109 are rocked as the square pans 108, 108' rotate and carry the shafts and angle members 111 around shaft 104 causing the followers 113 to trace the outline of the cam 112. Fixed to the angle members 111 are a plurality of pick-up devices having spring fingers 115, 115' having two sets of integral torsion spring portions 116, 116' and a mounting bight portion 117 by means of which the pick-up devices are secured to angle members 111 by suitable means such as bolts or the like whereby the spring fingers 115, 115' are moved through various positions relative to shaft 104 by the cam for effectively engaging the windrows of hay on the ground and transferring such hay up onto the apron 101. To guide the hay and to prevent the hay from winding around the drum formed by pans 108, 108' and angle members 110, a plurality of V-shaped brackets 119 are fixed by their bight portions to the arcuate channel member 105 adjacent the lower leg 120. The lower leg 120 of each bracket is fixed to one end of a cooperating strap guide member 121, the upper leg 122 of the U-shaped bracket 119 being fixed to the other end of the strap guide member 121 inwardly from the said other end thereof. The straps 121 are of channel section and the webs of the channels are cut away at the upper end to provide overhanging portions 123 which overlie the apron 101. The downwardly extending member 106 limits the lower position of the pickup drum and such pickup drum is raised by means of a handle 124 integral with a rod 125 connected to a plate fixed to the upper flange of the arm 102. An L-shaped lug 126 is fixed to rod 125 and is of a size to pass through a slot 127 in a horizontal plate fixed to the upper portion of the apron housing 20. To raise the pickup drum to inoperative position for travel from one field to another the handle 124 is raised until L-shaped lug passes through slot 127 and the rod rotated until the L-shaped lug has its stem overhanging the edge of the slotted plate for retention of the rotary drum in inoperative position. It will be noted that pivots 103, 103' are arranged rearwardly of the extension 123 of the strap members 121.

Fork feed

After the hay is collected on the apron 101 it is forced into the bale forming chamber by a pair of forks 128, 129 (Figs. 1, and 3–6) which are pivotally mounted on a carriage 130 which in turn is mounted for reciprocating motion on guide rails 131, 131' which are secured by bolts or the like to the inner surface of facing channels 132, 132' which are mounted in parallel relation above the apron 101 and above the upper wall 38 of the bale forming chamber.

The carriage 130 has an upper frame including longitudinally extending outwardly facing channel members 133, 133' which are connected together by inverted L-shaped members having the transverse portion 134, 134A, 134B, secured to the web portions of the outwardly facing channel members 133, 133' of the upper carriage frame while the stem portions 135, 135A, 135B extend downwardly and support a lower frame having longitudinal members 136, 136', the left ends of such longitudinal members 136, and 136' bent downwardly at the end thereof adjacent the bale forming chamber to provide an offset portion 137 providing clearance between the left ends of the upper and lower frame. Mounted on the upper edges of the projecting portions of the members 136, 136' is an overhanging plate 138 which is adapted to pass under the upper surface 38 of the bale forming chamber in the projected position of the carriage. Suitable bearing structure in the form of bearing pads such as graphite impregnated bars are mounted in the outwardly extending channel elements 133, 133' for slidable engagement with rails 131 and 131' for reduction in friction as the carriage moves from its retracted position shown in Figs. 1 and 6 to its projected position shown in Fig. 3, the bearing pads being secured in any suitable manner as by bending over portions of the outwardly extending channels 133, 133' of the carriage frame.

For reciprocating the fork carriage, a bracket 139 in the form of a question mark (?) has a stem thereof secured to the channel 133 and the horizontal portion 140 secured to upper edge of the channel 133' with the hook embracing a driven chain 141, the chain being secured with relation to the bracket 139 by means of a bolt 142 passing through a block 143 and into a block 144. The block 144 is substituted for one of the links of the chain and the bolt is threaded into a tapped bore on the side of the bight portion of the hook away from the block 143 thereby fixing the carriage with respect to the link 144 of the chain 141. The chain 141 is guided over a freely rotatable sprocket 145 mounted on a vertically extending shaft mounted in a fork 146 and adjustable in a suitable manner to control the tension of the chain 141. The other end of the chain 141 is supported on the upper sprocket 147 of a double sprocket which also has a lower and smaller sprocket 148 fixed with relation to the sprocket 147, and the double sprocket is freely rotatably mounted on a suitable shaft extending upwardly from the bale forming chamber.

Mounted on the leading ends of the longitudinal members 136, 136' is the fork or tine means 128 which is pivotally mounted in suitable bearings between the longitudinal members and is prevented from movement in one direction by a stop element 149 which has its leading edge arranged to contact a shoulder on the fork 128 and a similar plate 149' has its leading edge abutting against a shoulder on the trailing fork 129 whereby the forks or tine means are prevented from moving beyond the position shown in Figure 6 as the carriage 130 advances in the direction to move the hay collected on the apron 101 into the bale forming chamber. It will be noted that the end of the hay collecting apron 21 is provided with an opening 150 to accommodate the fork 129 in its retracted position and it will be evident that the forks 128 and 129 can swing upwardly over the hay during the retracting movement of the carriage 130 so during the projecting movement of the carriage, the forks 128 and 129 serve as detents to push the hay into the bale forming chamber.

The sprocket 148 is rotated by means of a chain 151 which passes over the sprocket 148 and over an idler sprocket 152 rotatably mounted on a stub shaft 152' suitably supported from the top of the bale forming chamber, the stub shaft preferably being supported so the chain may be tightened. The chain 151 is given an oscillating motion from the plunger 50 by means of a hat shaped bracket 153 fixed to the inner face of the forward extension 92 of the plunger by any suitable means and such hat shaped bracket fixedly supports an inverted J-shaped member 154 in fixed position relative to the bracket 153 by means of one or more bolts 155A while the hook portion of the J-shaped member embraces a special block link 155 which connects the ends of the chain 151, the block link 155 having a plurality of openings 156 therethrough for receiving a shear pin or bolt 157 which passes through one of the openings 156 in the block and through aligned openings 157' in the hook portion of the inverted J-shaped member 154 whereby accurate adjustment of the parts may be obtained, the shear pin being designed to shear in the event of excessive strain thereby preventing damage to the mechanism. A pin 158 projecting through the special block link 155 and projecting from both sides is located rearwardly of the member 154 as shown in Fig. 14 and Fig. 1 so that upon shearing of the pin 157, the chain 151 will be moved by engagement of pin 158 with the hook portion of the J-shaped member to a position which will cause the forks 129 and 128 to be retracted to the position shown in Fig. 6 and further operation of the mechanism will have no effect on the forked feed.

For operating the pickup drum and the knotter, power is taken from the sprocket 89 fixed to the ring gear shaft 81, the sprocket 89 having a chain 158X passing thereover and around a sprocket 158A fixed to an idler shaft rotatably mounted on bearings below the bottom wall 38' and such idler shaft 158B carries a second sprocket 158C over which a knotter and needle operating chain 158D passes which knotter chain engages a sprocket 159 which is rotatably mounted on a wheel 160 rotatably mounted on a shaft 161 rotatably mounted in suitable bearings below the bale forming chamber 20, the shaft 161 being connected by the universal joints 162 to an intermediate shaft 163 which is connected by a second universal joint to the shaft 104 for rotating the pickup drum as previously explained for raising hay from the ground level to the horizontal apron 101. The wheel 160 is driven from the sprocket 159 by friction elements 164, 164' which engage corresponding opposed sides of a flange 165 on the wheel 160. A plate 166 engages the friction material 164 and the plate 166 and sprocket 159 are then pressed together by a plurality of springs 167 which are maintained in adjusted position by means of bolts 168 and nuts 169 so that the torque obtained on the shaft 161 can be limited to avoid breakage in the event of jamming in the pickup mechanism. The chain 158 is kept taut by an idler sprocket 158' which is adjustable to maintain the proper degree of tension on the chain, and chain 158D is maintained in adjusted condition by idlers 170, and 171 upon return of the chain from knotter sprocket 172.

The knotter sprocket 172 is freely rotatably mounted on the knotter shaft 173, the shaft 173 being rotated by a single revolution clutch from the constantly rotating sprocket 172. The sprocket 172 is provided with a drum 174 on the inner periphery of which a drum lug 175 is fixedly mounted by means of a machine screw 176. Fixedly mounted on the knotter shaft 173 is a cam 177 which carries an offset crank throw 178 which is connected by a link 179 to a laterally extending arm 180 projecting from the needle carrying arm 41 so that upon a revolution of cam 177 and crank arm 178 the needles 39 are projected to a position where the eye ends of the needles are above the bale forming a chamber 20 and in position to have the cord or wire carried by the needle received by the knotter or wire twisting mechanism in a well known manner and thereafter during the same revolution of the cam 177 the needles are returned to the inoperative position shown in the drawings.

The cam 177 has a detent 181 pivotally mounted on a pin 182 passing through the detent 181 and through the cam 177 and a lug 183 integral with the cam to provide the equivalent of a fork which receives the detent 181 between the tines thereof. A roller 184 is rotatably mounted on one end of the detent 181 and such roller is normally out of contact with the lug 175 on the sprocket 172, such roller being maintained in such operative position by means of a bell crank lever 185 which is pivotally mounted at its knee in any suitable manner and one leg 186 thereof engages the projecting end 187 of the detent 181 preventing rotation of the cam 177. The other arm 188 of the bell crank lever 186 serves as a cam follower being normally received in the recess 189 in the cam 177 and except for the initiating of the needle operating cycle and knotter cycle the arm 188 does not engage the bottom of the recess 189. The arm of 186 is normally in engagement with the end 187 of the detent 181. The arm 188 is pivotally connected to a bar 189 fixed to an arcuately shaped segment 190 which segment 190 rides in a groove of a pulley 191 which pulley 191 is mounted on a shaft 192 which carries a toothed element 193 which engages the bale of hay during the formation thereof. The toothed wheel 193 is rotated in accordance with the length of the bale being formed with resulting rotation of the shaft 192 and pulley 191. The arcuate shaped segment 190 is raised by rotation of pulley 191 until a notch 194 in the arcuate segment reaches the pulley 191 at which time the notch 194 permits forward movement of the bar 189 which forward movement results from a tension in a spring 195 extending between the bell crank 185 and a fixed anchor on the bale forming chamber.

The movement permitted by the notch 194 is sufficient to release the outer end of arm 186 from the end 187 of the detent 181 thereby permitting detent 181 to be moved by operating spring 196 to the position where the roller 184 contacts the inner periphery of drum 174 and then contacts the lug 175 so that upon rotation of the sprocket 172, the cam 177 is rotated therewith for a complete revolution. During the revolution of cam 177, the arm follower 188 and the link 189 are moved rearwardly, thereby releasing the notch 194 from the pulley 191 and permitting the arcuate shaped segment 190 and the bar 189 to drop to the position shown in Fig. 2 and with such motion the bell crank 184 in the arm 186 can be returned to the position shown in Fig. 2 by the action of spring 195 and the end of 187 of the detent 181 abuts the end of arm 186 causing the detent 181 to be restored to its full tine position shown in Figure 16 at which time the roller 184 is released from the lug 175 and the sprocket 172 may again rotate freely. The length of the bale of hay is controlled by the position of a clamp 196 which is adjustable on the arcuate shaped segment 190 and such clamp engages the periphery of the pulley 191 to prevent the arcuate portion 190 from dropping all the way and in accordance with the adjustment of the clamp 196 the length of the bales of hay can be accurately determined.

Although kotters and wire twisters are not shown in detail, it will be apparent that the conventional knotters or wire twisters are operated by segmental gears 197, 197' fixed on shaft 173 in timed relation to the movement of the needles as controlled by the length of the bale by means of the bale length control including arcuate segment 190 and clamp 196.

Although the baler is described as a hay baler, it will be apparent that the structure is suitable for other types of baling operations.

The present baler is made considerably smaller than existing balers thereby reducing the inertia forces permitting much higher speed without failure and also reducing the total power consumption per bale and per unit of bale wire of other products.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A hay baler comprising an elongated housing having a bale forming chamber therein, an axle extending transversely of said housing, wheels supported on the ends of said axle to provide for movement of said baler along the ground, an apron projecting to the right of the housing and communicating with said housing to a hay receiving opening adjacent said apron, a pick-up mounted on said apron and having a plurality of sets of tines adapted to contact hay on the ground and raise such hay to the apron, a tow bar tongue pivotally mounted on said axle and extending forwardly of said housing, means to secure said tongue in two angular positions with respect to said housing and apron whereby said baler may be towed directly behind a tractor or towed to one side of and behind the tractor, a gear case mounted on said housing, means to secure the forward end of the tongue to a tractor, a pinion and ring gear casing having pinion and ring gear shafts and gears thereon mounted in said casing, a crank and a sprocket mounted on said ring gear shaft, a pitman pivotally connected at one end to said crank, a plunger slidably mounted in said housing and pivotally connected to said pitman, inwardly projecting guide rails on the top and bottom of said casing, guide rollers adjustably mounted on said plunger for cooperation with said rails for accurately guiding said plunger in reciprocating motion, the rear or operative face of said plunger being provided with needle receiving slots, and the side of said plunger adjacent said apron being beveled forwardly, a cutter blade mounted on said plunger adjacent said bevel with its cutting edge forwardly of the operative surface of said plunger, a cooperating blade on the casing adjacent the rear of the hay receiving opening in said housing, a flywheel mounted on said pinion shaft, and being frictionally connected thereto, whereby stoppage of either the flywheel or said pinion shaft will not produce undue strain, a continuously operating one-way clutch having its driven element connected by a torque limiting friction clutch to said pinion shaft, a driving element for said continuously operating one way clutch, telescoping shaft means including universal joints for operating said drive element for said one-way clutch, fork guide rails mounted above said apron, a carriage mounted on said rails for sliding movement toward and away from the housing, a fork support suspended from said carriage and having an offset leading portion adapted to extend into the bale forming chamber and so arranged that a portion of the carriage projects above such chamber, forks pivotally mounted on said fork support, a double sprocket mounted on said housing, a sprocket mounted at the forward end of said housing, a drive chain extending over said forward sprocket and one of said sprockets in said double sprocket, means to connect said drive chain to said plunger for oscillation therewith, an idler sprocket on the outer end of said apron, a driven chain extending between the other sprocket of said double sprocket and said outer sprocket, means to connect said driven chain to said carriage for causing reciprocation of said carriage so that said forks engage hay and move the hay into the chamber and upon withdrawal movement said forks will slide over the hay.

2. A fork feed for moving the hay from a pick-up apron to a bale-forming chamber of a hay baler having a plunger comprising a pair of rails extending from above the bale-forming chamber to the outer end of the apron, a carriage mounted for reciprocation on said rails, a horizontally-disposed fork mount suspended below said carriage and including a downwardly offset leading fork mounting portion whereby the top of the bale-forming chamber may be received between said mounting portion and the adjacent portion of said carriage, a sprocket rotatably mounted adjacent the outer end of the apron, a driven chain, a double sprocket rotatably mounted adjacent the bale-forming chamber and having one of its sprockets positioned so that a run of said driven chain is substantially parallel to said rails, means to secure said carriage to a portion of said driven chain whereby reciprocation of said chain will cause reciprocation of said carriage, a fork pivotally mounted on the trailing end of said carriage and a fork pivotally mounted on the leading end of said carriage, and driving chain means to rotate the other sprocket of said double sprocket from the plunger of the hay baler whereby effective driving of said fork feed will be accomplished in proper ratio by the sizes of the sprockets in said double sprocket.

3. A hay baler comprising an elongated housing having a bale forming chamber therein, an apron projecting to the right of the housing and communicating with said housing to a hay receiving opening adjacent said apron, a gear case mounted on said housing, a pinion and ring gear casing having pinion and ring gear shafts and gears thereon mounted in said casing, a crank and a sprocket mounted on said ring gear shaft, a pitman pivotally connected at one end to said crank, a plunger reciprocably mounted in said housing and pivotally connected to said pitman, inwardly projecting guide rails on the top and bottom of said housing, guide rollers adjustably mounted on said plunger for cooperation with said rails for accurately guiding said plunger in reciprocating motion, the rear or operative face of said plunger being provided with needle receiving slots, and the side of said plunger adjacent said apron being beveled forwardly, a cutter blade mounted on said plunger adjacent said bevel with its cutting edge forwardly of the operative surface of said plunger, a cooperating blade on the casing adjacent the rear of hay receiving opening in said housing, fork guide rails mounted above said apron, a carriage mounted on said rails for sliding movement toward and away from the housing, a fork support suspended from said carriage and having an offset leading portion adapted to extend into the bale forming chamber and so arranged that a portion of the carriage projects above such chamber, forks pivotally mounted on said fork support, a double sprocket mounted on said housing, a sprocket mounted at the forward end of said housing, a drive chain extending over said forward sprocket and one of said sprockets in said double sprocket, means to connect said drive chain to said plunger for oscillation therewith, an idler sprocket on the outer end of said apron, a driven chain extending between the other sprocket of said double sprocket and said outer sprocket, means to connect said driven chain to said carriage for causing reciprocation of said carriage so that said forks engage hay and move the hay into the chamber and upon withdrawal movement said forks will slide over the hay.

4. The invention according to claim 3 in which the drive chain and the driven chain are positioned above the bale forming chamber and the support therefor is above the bale forming chamber to avoid interference with the feeding of hay.

5. A hay baler comprising a bale forming chamber having an inlet opening and an apron extending sidewardly therefrom, a reciprocating plunger in said bale forming chamber, rail means mounted above the level of said bale forming chamber and overlying said apron, a carriage mounted in said rail means and movable toward and away from said bale forming chamber, at least one fork pivotally mounted on a portion of said carriage and movable through the inlet opening into the bale forming chamber at least half the width thereof, a driven endless chain mounted in substantially parallel relation to said rail means and lying in a horizontal plane, guide sprockets adjacent each end of said apron and carrying said driven chain, a drive chain lying in a horizontal plane adjacent and above the bale forming chamber, said drive chain being guided on a rear sprocket fixed to the inner guide sprocket and on a front sprocket, means to connect one of the runs of said drive chain to said plunger whereby reciprocation of said plunger causes said carriage and said fork to be reciprocated for feeding hay to said bale forming chamber.

6. A hay baler for operation from the power take-off of a tractor comprising a bale forming chamber having an inlet opening and an apron extending sidewardly therefrom, a tongue for connection to the tractor for moving the baler through a field, a clutch drive mounted at the forward end of said bale forming chamber including a one-way clutch, a friction drive clutch and a friction supported and driven fly wheel whereby power from the power take-off of the tractor will be applied without damaging stress regardless of the relation of the baler to the tractor, a plunger reciprocable in said bale forming chamber, a track at the top and bottom of said bale forming chamber spaced from the side walls thereof, rollers supporting the plunger on said tracks for reciprocating movement, means to reciprocate said plunger from said clutch drive, rail means mounted above the level of said bale forming chamber and overlying said apron, a carriage mounted on said rail means and movable toward and away from said bale forming chamber, at least one fork pivotally mounted on said carriage on a horizontal axis transverse to said rail means and movable through the inlet opening into the bale forming chamber at least half the width thereof, an endless driven chain mounted in substantially parallel relation to said rail means and lying in a horizontal plane and connected to said carriage, guide sprockets adjacent each end of said apron carrying said driven endless chain, a drive chain lying in a horizontal plane adjacent and above the bale forming chamber, said drive chain being guided on a rear sprocket fixed to the inner guide sprocket and to a front sprocket, means to connect one of the runs of said drive chain to said plunger whereby reciprocation of said plunger causes said carriage and said fork to be reciprocated for feeding hay to said bale forming chamber.

7. The invention according to claim 6 in which a pick-up is provided on the front edge of said apron and is driven from said clutch drive and includes a plurality of outwardly projecting fingers and guiding bands beside which the fingers project, and means to move said pick-up fingers in a manner to maintain a portion of the fingers at an angle not greater than a right angle with respect to the bands in the direction of feed to prevent crushing or breaking of the fibers of hay thereby reducing the power requirements.

8. A hay baler comprising an elongated apron on which the hay is supported, substantially straight rail means positioned above said apron and extending in the same direction as said apron, means defining a bale forming chamber at one end of said apron and at one end of said rail means, said bale forming chamber being provided with an entrance opening at said one end of said apron for the entrance of hay, a ledger blade mounted at the rear edge of said opening, a carriage mounted on said rail means for reciprocating movement in the elongated direction of said rails, means to reciprocate said carriage including means above said apron connected to said carriage, tine means pivotally mounted on said carriage for movement in a direction toward and away from said bale forming chamber in the direction of the rails, means associated with said tine means and carriage limiting the pivotal movement of said tine means in a direction away from said bale forming chamber, said tine means being free to pivot in a direction toward said bale forming chamber whereby the reciprocation of said carriage and said tine means in a direction toward said bale forming chamber causes hay supported on said apron to be moved into said bale forming chamber and upon movement of said tine means in the opposite direction away from said bale forming chamber said tine means are pivotally moved by inertia forces and by contact with the hay to freely pass over the hay between said carriage and said apron.

9. A hay baler comprising an elongated apron on which the hay is supported, substantially straight rail means positioned above said apron and extending in the same direction as said apron, means defining a bale forming chamber at one end of said apron and at one end of said rail means, said bale forming chamber being provided with an entrance opening at said one end of said apron for the entrance of hay, a carriage mounted on said rail means for reciprocating movement in the elongated direction of said apron, means to reciprocate said carriage, tine means pivotally mounted on said carriage for movement in a direction toward and away from said bale forming chamber, means operatively associated with said carriage to limit the pivotal movement of said tine means in a direction away from said bale forming chamber, said tine means being free to pivot in a direction toward said bale forming chamber whereby the reciprocation of said carriage and said tine means in a direction toward said bale forming chamber causes hay supported on said apron to be moved into said bale forming chamber and upon movement of said tine means in the opposite direction away from said bale forming chamber said tine means are pivotally moved by inertia forces and by contact with the hay to freely pass over the hay between said carriage and said apron, a plunger mounted for reciprocation in said bale forming chamber, rollers on said plunger, guide rails in said bale forming chamber cooperating with said rollers for reducing frictional losses, means to reciprocate said plunger, and cooperating cutting means on said plunger and said bale forming chamber for severing the hay lying across the hay receiving opening in the bale forming chamber, the cutter on said plunger being located in a trailing portion of the plunger with respect to the operative face thereof whereby the cutting edge of the plunger cutter is maintained sharp for a longer time and the power required is materially reduced by avoiding brushing and wedging action of hay on said cutters during the insertion of hay.

10. A hay baler comprising an elongated apron on which the hay is supported, substantially straight rail means positioned above said apron and extending in the same direction as said apron, means defining a bale forming chamber at one end of said apron and at one end of said rail means, said bale forming chamber being provided with an entrance opening at said one end of said apron for the entrance of hay, a carriage mounted on said rail means for reciprocating movement in the elongated direction of said apron, means to reciprocate said carriage, said carriage having an offset extension below said rail adjacent said bale forming chamber for passage through the entrance opening in said bale forming chamber, tine means pivotally mounted on the extremity of said offset extension adjacent said bale forming chamber for movement into and away from said bale forming chamber, means operatively associated with said carriage to limit the pivotal movement of said tine means in a direction away from said bale forming chamber, said tine means being free to pivot in a direction toward said bale forming chamber whereby the positive reciprocation of said carriage and said tine means causes hay supported on said apron to be moved into said bale forming chamber and upon movement of said tine means in the opposite direction away from said bale forming chamber said tine means are pivotally moved by inertia forces and by contact with the hay to freely pass over the hay between said carriage and said apron.

11. The invention according to claim 10 in which a plunger is reciprocated past the entrance opening in said bale forming chamber to compact the hay and drive means are positively connected between said plunger and said carriage so that said extension and tine means thereon are withdrawn when the plunger passes said opening.

12. The invention according to claim 8 in which a plunger is reciprocated in said bale forming chamber past the entrance opening, and chain means positively connect said plunger and said carriage providing the said means to reciprocate said carriage.

13. The invention according to claim 8 in which the means to reciprocate the carriage includes a plunger mounted for reciprocation in said bale forming chamber past the entrance opening, a portion of the plunger face adjacent the entrance being offset with a cutting blade mounted on the offset portion in trailing relation to the operative face of the plunger whereby the tine means will carry the hay into the bale forming chamber without substantially contacting the cutting blade and the plunger moves so that the cutting blade cooperates with the ledger blade to completely sever the portion of the hay within the bale forming chamber from the hay on the apron.

14. The invention according to claim 13 in which the plunger is reciprocated by a crank and pitman driven from a source of power through a one-way driving clutch, and an overload limiting clutch operable in either direction.

15. The invention according to claim 14 in which a flywheel is mounted on a shaft driven by a source of power for relative rotation with respect to the source of power upon an excessive torque being encountered.

16. The invention according to claim 8 in which a pickup drum is provided in advance of the apron and includes fingers extending outwardly from the pickup drum for moving hay from a lower elevation on the ground onto the apron.

References Cited in the file of this patent

UNITED STATES PATENTS

| | | |
|---|---|---|
| 803,126 | Northcutt | Oct. 31, 1905 |
| 808,996 | Livengood | Jan. 2, 1906 |
| 1,043,345 | Nixon | Nov. 5, 1912 |
| 1,590,319 | Robbins | June 29, 1926 |
| 2,030,031 | Innes | Feb. 4, 1936 |
| 2,409,478 | Dickow | Oct. 15, 1946 |
| 2,432,212 | Russell | Dec. 9, 1947 |
| 2,464,059 | Roos et al. | Mar. 8, 1949 |
| 2,487,938 | Nikkel | Nov. 15, 1949 |
| 2,545,188 | Baskerville | Mar. 13, 1951 |
| 2,549,247 | Scott | Apr. 17, 1951 |
| 2,682,743 | Hintz | July 6, 1954 |
| 2,700,865 | Russell | Feb. 1, 1955 |
| 2,720,073 | Freeman et al. | Oct. 11, 1955 |
| 2,743,117 | Hutchings | Apr. 24, 1956 |
| 2,757,602 | Nolt | Aug. 7, 1956 |
| 2,771,306 | Ash | Nov. 20, 1956 |